United States Patent [19]

Kanai et al.

[11] Patent Number: 4,764,827
[45] Date of Patent: Aug. 16, 1988

[54] INTERMITTENT GEAR MECHANISM

[75] Inventors: Takao Kanai; Katsumi Yamaguchi; Shigeo Kinoshita; Kikuo Yoshikawa; Syouichiro Yokoi, all of Tokyo, Japan

[73] Assignee: Clarion Co., Ltd., Tokyo, Japan

[21] Appl. No.: 70,951

[22] Filed: Jul. 8, 1987

[30] Foreign Application Priority Data

Jul. 15, 1986 [JP] Japan ............................... 61-166058
Jul. 15, 1986 [JP] Japan ............................... 61-166057

[51] Int. Cl.[4] .................. G11B 15/66; G11B 15/67; G11B 15/665; F16H 37/06
[52] U.S. Cl. .................... 360/96.5; 74/405; 74/665 GA; 360/85; 360/95
[58] Field of Search ............ 360/96.5, 96.6, 85, 360/95; 74/665 GA, 665 F, 384, 405, 406

[56] References Cited

U.S. PATENT DOCUMENTS

| | | | |
|---|---|---|---|
| 4,577,246 | 3/1986 | Matsuki | 360/96.5 |
| 4,638,386 | 1/1987 | Takamatsu | 360/96.5 |
| 4,723,236 | 2/1988 | Kitami | 360/96.5 |

Primary Examiner—Robert S. Tupper
Attorney, Agent, or Firm—Flynn, Thiel, Boutell & Tanis

[57] ABSTRACT

An intermittent gear mechanism includes two intermittent gears mounted at opposite sides of a driving gear driven by a motor. One of the intermittent gears is normally held by a holding member at a position disengaged from the driving gear while the other intermittent gear engages the driving gear. When the latter intermittent gear is driven, the former intermittent gear is brought into engagement with the driving gear by a simple initial driving assembly.

2 Claims, 7 Drawing Sheets

INTERMITTENT GEAR MECHANISM

FIELD OF THE INVENTION

This invention relates to an intermittent gear mechanism using a single motor for driving two intermittent gears independently, and more particularly to a small-scaled simplified intermittent gear which does not require a particular driving force to bring each intermittent gear into its drivingly linked position from its dormant position.

BACKGROUND OF THE INVENTION

In audio devices or other various electrical devices including a driving system, structural simplification and space reduction are required for the entire driving mechanism in order to promote scale reduction and operational reliability of the device. Such an intermittent gear mechanism including a single motor which drives two intermittent gears independently has been developed to meet the requirement.

Basic features of the intermittent gear mechanism is that two intermittent gears are opposedly disposed at opposite sides of a driving gear connected to a motor, and that sequential operation is repeated: i.e. while a first intermittent gear is driven, a second intermittent gear is held at a dormant position; and when the first intermittent gear approaches a dormant position, it is held in the dormant position, and the second intermittent gear is brought into an initial driving configuration from the dormant position.

In this connection, the intermittent gear mechanism needs holding means for holding the intermittent gears at dormant positions and initial driving means for bringing them into initial engagement with the driving gear. Usually, holding members using a biasing force of a resilient member are employed as the holding means. In order to move the intermittent gears from their dormant positions against the energy of the holding means, a forcible initial driving arrangement using a plunger or manual force has been employed heretofore. However, this arrangement invites dimensional increase and structural complication of the mechanism, and spoils one of the advantages of the intermittent gear mechanism. This drawback has been noted particularly in the field of car audio devices in which dimensional reduction is strongly required.

OBJECT OF THE INVENTION

It is therefore an object of the invention to provide a small-scaled, simplified intermittent gear mechanism, including a simple arrangement for establishing initial driving engagement of two intermittent gears in a mechanism using a single motor to drive the intermittent gears independently.

SUMMARY OF THE INVENTION

To attain the object, the invention employs an initial driving means for the intermittent gears which includes pivotable members pivotably mounted on shafts of the intermittent gears and an elongated member having opposite ends connected to respective ends of the pivotable members to form an initial driving link. Additionally, each intermittent gear is provided with an engaging portion configured to engage the initial driving link when the intermittent gear is located near its dormant position.

With this arrangement, the intermittent gears can be brought into their initial driven configuration by a simple arrangement. More specifically, the engaging portions of both intermittent gears engage the initial driving link upon completion of motion of the first intermittent gear, the engaging force receives a counterforce of the first intermittent gear and urges the second intermittent gear into its initial engagement position. Therefore, the mechanism is small-scaled and simplified.

DETAILED DESCRIPTION

Figure 1:
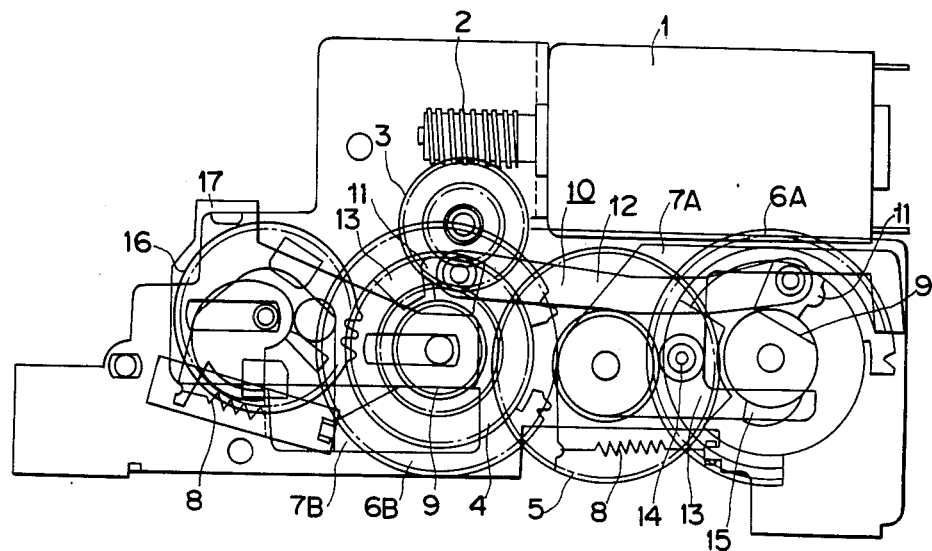
FIGS. 1 through 6 are plan views illustrating an intermittent gear mechanism embodying the invention.

The invention is described below in detail, referring to an intermittent gear mechanism embodying the invention illustrated in the drawings.

In FIG. 1, driving power of a driving motor 1 is transmitted to a driving gear 5 through a worm 2 formed on a shaft of the driving motor 1, a worm wheel 3 engaging the worm 2, and a connection gear 4. At opposite sides of a small gear of the driving gear 5 are mounted first and second intermittent gears 6A and 6B which are identical in dimension. The second intermittent gear 6B is mounted coaxially with but independently from the connection gear 4.

Around the first and second intermittent gears 6A and 6B are mounted holding members 7A and 7B for holding the gears 6A and 6B at their inactivated (dormant) positions. The holding members are biased by springs 8—8 in a direction for their holding operation. Each intermittent gear 6A (6B) has a planar engaging portion 9 for accepting the holding member 7A (7B).

Between the intermittent gears 6A and 6B is provided an initial driving link 10 which consists of two pivotal members 11 pivotably supported on the shafts of the intermittent gears 6A and 6B and an elongated member 12 whose opposite ends are pivotably connected to respective ends of the pivotal members 11. Each intermittent gear 6A (6B) also includes an engaging portion 13 which is engaged and urged by the initial driving link 10 upon a change of gears.

The first intermittent gear 6A is provided with an engaging pin 14 reciprocally moving a slide plate (not shown) and a cam 15 for pivotably moving another operation member. The second intermittent gear 6B is configured to reciprocally move an operation member 17 via a cam gear 16.

With this arrangement, the embodiment operates as follows.

(1) From forward rotation of the first intermittent gear to a change of gears:

When the driving motor 1 is rotated forwardly from the configuration of FIG. 1, the connection gear 4 is rotated counterclockwisely via the worm 2 and the worm wheel 3, and the driving gear 5 is rotated clockwisely. As a result, the first intermittent gear 6A engaging the driving gear 5 starts to rotate in the counterclockwise direction. At this time, the second intermittent gear 6B is located at its inactivated (dormant) position (where it does not engage the driving gear 5) and is held there by engagement between its engaging portion 9 and the holding member 7B.

Figure 2:
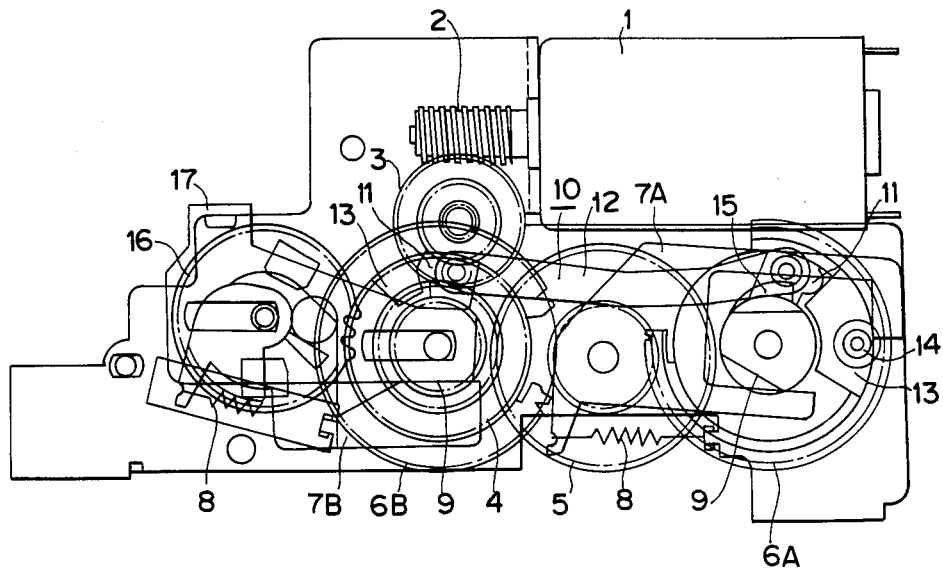

When the first intermittent gear 6A further rotates through the position of FIG. 2 up to about a half revolution from the starting position of FIG. 1, the pivotal member 11 engages the engaging portion 13 and is urged to the left in the drawings. As a result, the pivotal member 11 of the second intermittent gear 6B is rotated to the left in the drawings via the elongated member 12 into engagement with the engaging portion 13 of the second intermittent gear 6B. Therefore, the second intermittent gear 6B is slightly rotated counterclockwisely and engages the driving gear 5 (FIG. 3).

Figure 3:
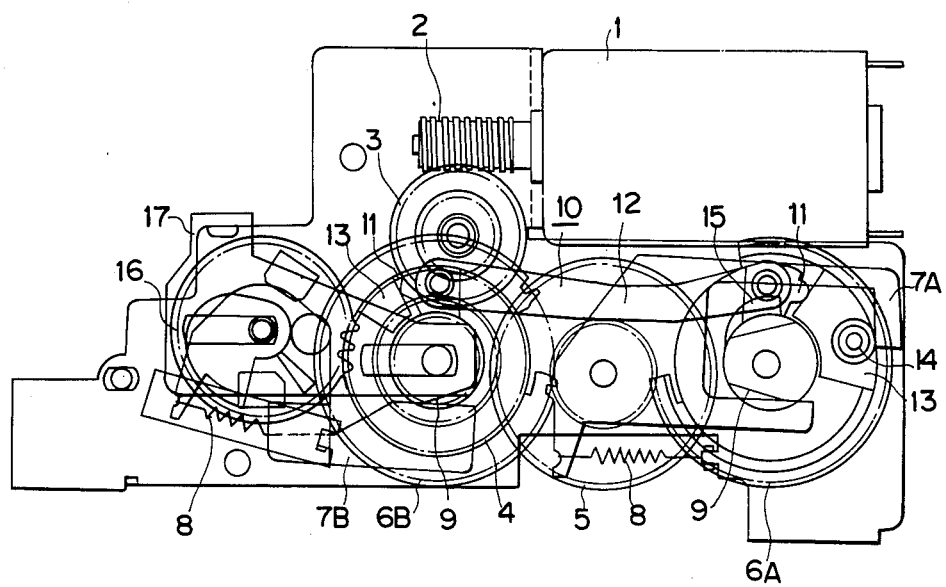
Figure 4:
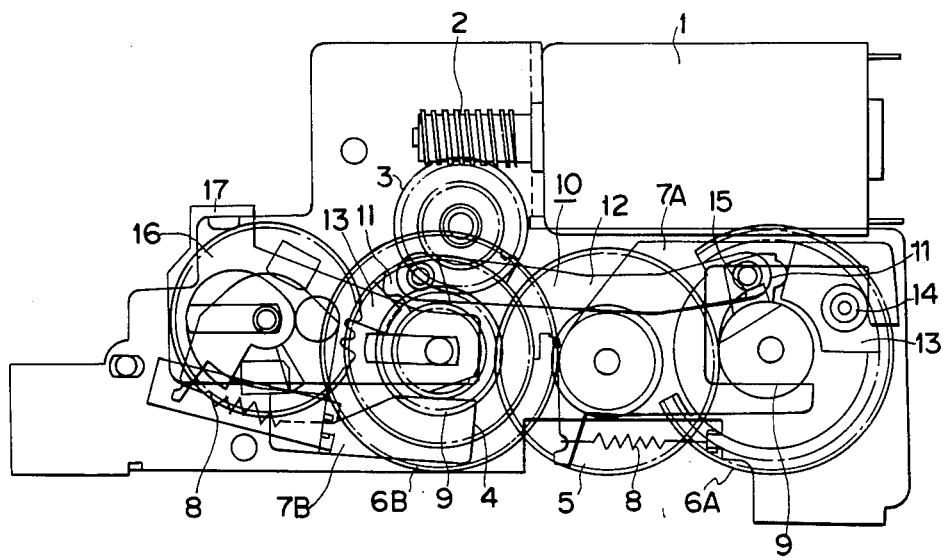

If the driving motor 1 is rotated from the configuration of FIG. 3, the first intermittent gear 6A is slightly rotated and held at its inactivated (dormant) position by the holding member 7A as shown in FIG. 4.

Figure 5:
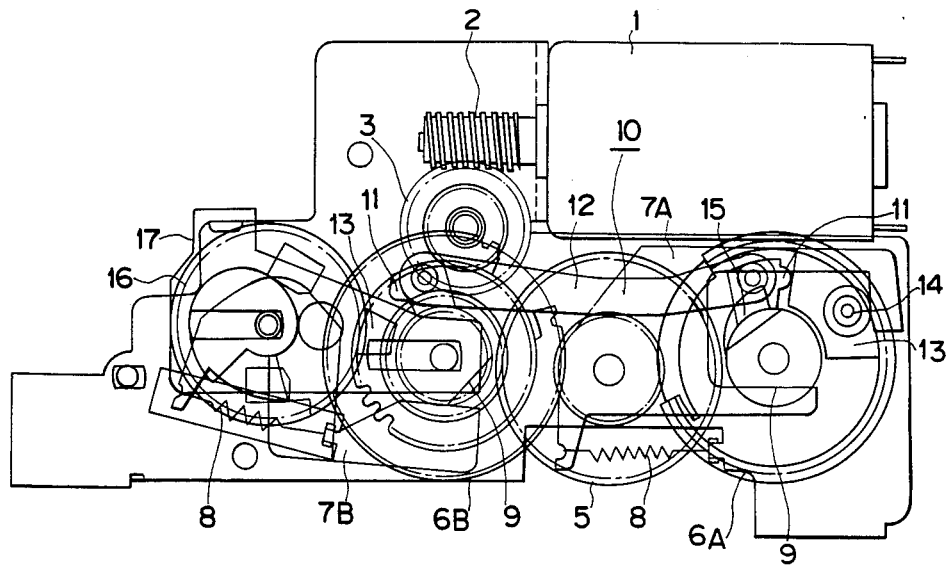

(2) Forward rotation of the second intermittent gear:

When the driving motor 1 is further rotated in the same direction after a gear change of FIG. 4, the second intermittent gear 6B is rotated in the counterclockwise direction to move its engaging portion 13 away from the pivotal member 11 of the initial driving link 10 as shown in FIG. 5.

On the other hand, the cam gear 16 rotates in the clockwise direction in response to the counterclockwise rotation of the second intermittent gear 6B, and drives the operation member 17 to the right in the drawings. Finally, as shown in FIG. 6, when the second intermittent gear 6B finishes about a half revolution until the engaging portion of the operation member 17 rides on the largest diameter portion of the cam gear 16, the operation member 17 completes its rightward motion.

Figure 6:
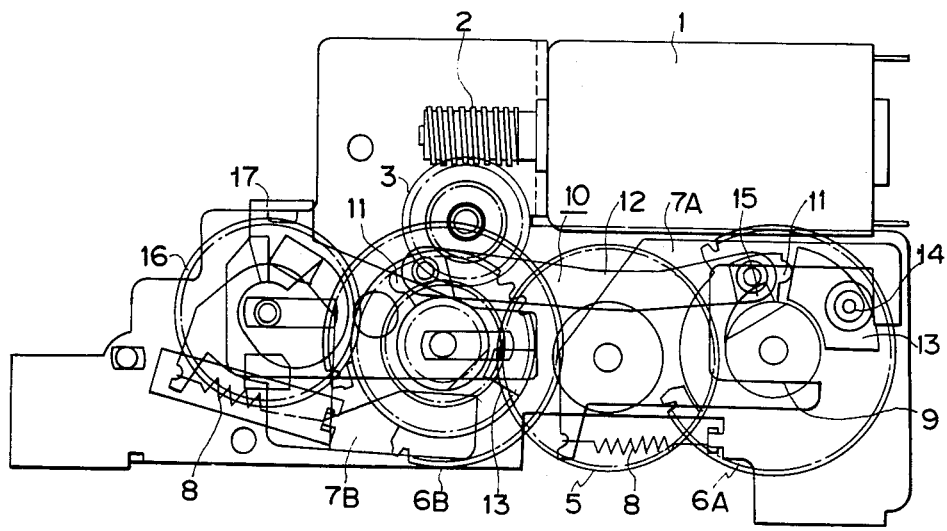

(3) From reverse rotation of the second intermittent gear to a change of gear:

When the driving motor 1 is rotated reversely from the configuration of FIG. 6, the second intermittent gear 6B rotates clockwisely. Responsively, the cam gear 16 rotates counterclockwisely and moves the second operation member 17 to the left in the drawings. When the second intermittent gear 6B finishes about a half revolution from the starting position of FIG. 6, its engaging portion 13 engages the pivotal member 11 as shown in FIG. 4, and pushes same to the right. As a result, the pivotal member 11 of the first intermittent gear 6A is pivoted to the right via the elongated member 12 and engages the engaging portion 13. Therefore, the first intermittent gear 6A slightly rotates counterclockwisely into engagement with the driving gear 5 (FIG. 3).

If the driving motor 1 is rotated from the configuration of FIG. 3, the second intermittent gear 6B is slightly rotated and held at its inactivated (dormant) position by the holding member 7B as shown in FIG. 2.

(4) Reverse rotation of the first intermittent gear:

When the driving motor 1 is rotated reversely from the configuration of FIG. 2, the first intermittent gear 6A further rotates clockwisely, and finally stops at the forward rotation starting position of FIG. 1.

As described, according to the invention, since the initial driving link 10 is provided between the two intermittent gears 6A and 6B so as to readily effect a change of gears, motions of two operation members not shown effected by the first intermittent gear 6A and reciprocal motion of the operation member 17 effected by the second intermittent gear 6B can be performed independently. More specifically, the aforegoing embodiment contributes to a significant dimensional reduction and simplification of the mechanism as compared to the prior art mechanism using a plunger or a manual force as the initial driving means. Therefore, the mechanism is particularly advantageous when used in a car audio device, etc. for which scale reduction or simplification is strongly demanded.

The invention is not limited to the above-described embodiment, buy may include some modifications within the scope of the invention. For example, each intermittent gear may be configured to drive a single operating member exclusively, or to drive two or more operating members. Further, the intermittent gears need not be identical in dimension, and other suitable arrangement may be adopted for engagement between the initial driving link and each intermittent gear.

As described above, the invention arrangement reliably, selectively brings two intermittent gears to their initial driven positions and hence establishes independent operations of the respective intermittent gears, by using a simple arrangement including the initial driving link provided between the intermittent gears to engage each intermittent gear located near its inactivated (dormant) position. Therefore, the mechanism sufficiently meets the requirement of scale reduction and simplification of the structure.

Hereinbelow, an embodiment of the invention intermittent gear mechanism used in a pack loading drive mechanism is described in detail, referring to the drawings.

Figure 7:
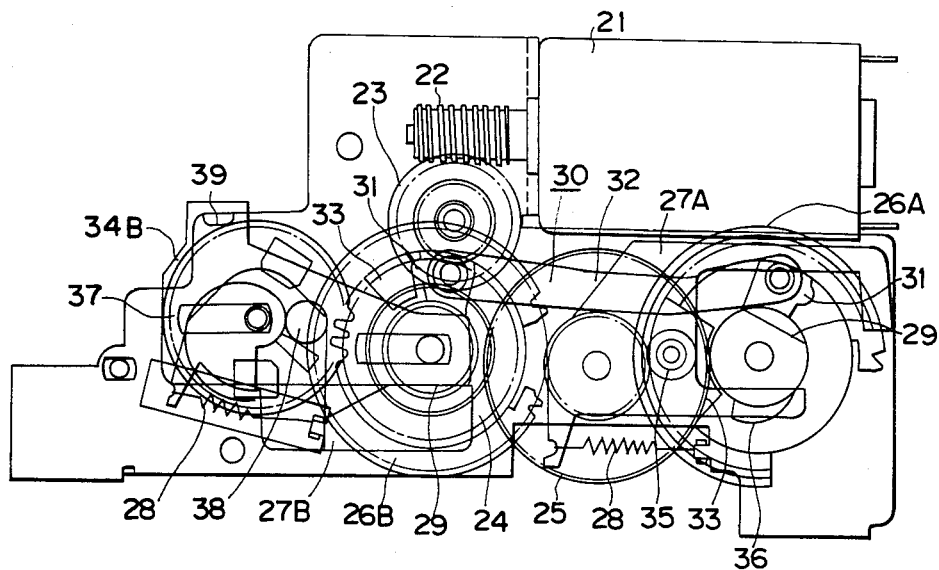
FIGS. 7 through 12 are plan views of a pack loading mechanism using the invention intermittent gear mechanism, which plan views stepwisely show gear motions.

In FIG. 7, driving power of a driving motor 21 is transmitted to a driving gear 25 through a worm 22 formed on a shaft of the driving motor 21, a worm wheel 23 engaging the worm 22, and a connection gear 24. At opposite sides of a small gear of the driving gear 25 are mounted first and second intermittent gears 26A and 26B which are identical in dimension. The second intermittent gear 26B is mounted coaxially with but independently from the connection gear 24.

Around the first and second intermittent gears 26A and 26B are mounted holding members 27A and 27B for holding the gears 26A and 26B at their inactivated (dormant) positions. The holding members are biased by springs 28—28 in a direction for their holding operation. Each intermittent gear 26A (26B) has a planar engaging portion 29 for accepting the holding member 27A (27B).

Between the intermittent gears 26A and 26B is provided an initial driving link 30 which consists of two pivotal members 31 pivotably supported on the shafts of the intermittent gears 26A and 26B and an elongated member 32 whose opposite ends are pivotably connected to respective ends of the pivotal members 31. Each intermittent gear 26A (26B) also includes an engaging portion 33 which is engaged and urged by the initial driving link 31 upon a change of gears.

Figure 13:
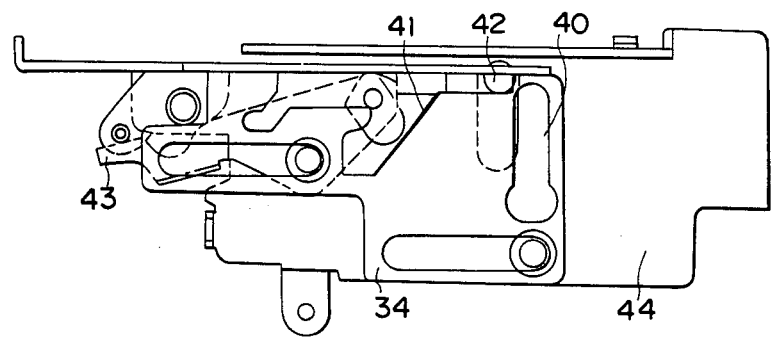
FIGS. 13 and 14 are plan views a pack loading slide plate used in the mechanism of FIGS. 7 through 12.

The first intermittent gear 26A is provided with an engaging pin 35 for moving a slide plate 34A (for tape pack loading) shown in FIG. 13 back and forth (right-and-left reciprocation in the drawing) and a cam 36 for pivotably moving a dust-proof door driving link (not shown). The second intermittent gear 26B is configured to reciprocally move a slide plate 34B (for close contact between a pinch roller and a capstan shaft) via cam gear 37. The slide plate 34B is driven by the cam gear 37 via an engaging pin 38 to move a pinch roller close contact member (not shown) engaging its engaging hole 39 back and forth to move a pinch roller to or away a capstan shaft.

In FIG. 13, reference numeral 40 denotes an elongated hole provided in the pack loading slide plate 34A to engage the engaging pin 35A of the first intermittent gear 26A. Reference numeral 41 refers to a slot cam for guiding a guide pin 42 of a pack guide, 23 to a lid opening link for opening a lid of a cassette, and 42 to a support board of a magnetic recording apparatus.

With this arrangement, the embodiment operates as follows.

(1) From pack loading motion to gear changing motion:

When the driving motor 21 is rotated forwardly from the configuration of FIG. 7, the connection gear 24 is rotated counterclockwise via the worm 22 and the worm wheel 23, and the driving gear 25 is rotated clockwisely. As a result, the first intermittent gear 26A engaging the driving gear 25 starts to rotate in the counterclockwise direction. At this time, the second intermittent gear 26B is located at its inactivated (dormant) position and held there by engagement between its engaging portion 29 and the holding member 27B.

Figure 8:
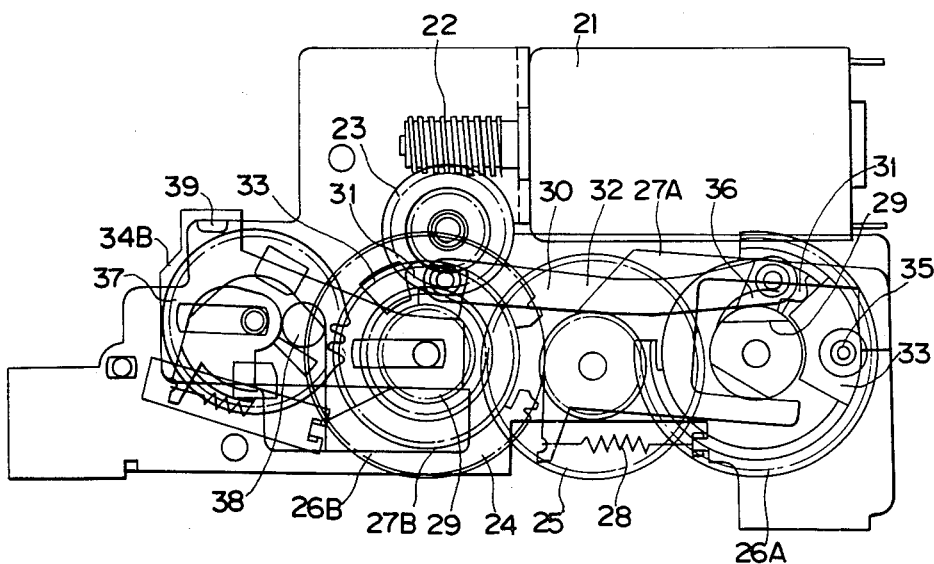
Figure 14:
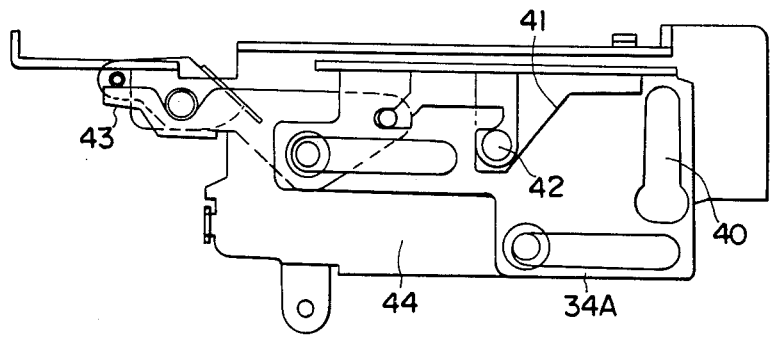

With a further rotation of the intermittent gear 26A up to the position of FIG. 8, its engaging pin 35 moves from a rear position (from a left-hand position in the drawing) to a front position (to a right-hand position in the drawing). Therefore, the pack loading slide plate 34A moves from a rear position of FIG. 13 to a front position of FIG. 14. As a result, the guide pin 42 of a pack guide accepted in the slot cam 41 of the slide plate 34A drops, and a pack loading operation is accomplished.

When the first intermittent gear 26A further rotates from the position of FIG. 8 up to about a half revolution from the starting position of FIG. 7, the pivotal member 31 engages the engaging portion 33 and is urged to the left in the drawings. As a result, the pivotal member 31 of the second intermittent gear 26B is rotated to the left in the drawings via the elongated member 32 into engagement with the engaging portion 33 of the second intermittent gear 26B. Therefore, the second intermittent gear 26B is slightly rotated counterclockwisely and engages the driving gear 25 (FIG. 9).

Figure 9:
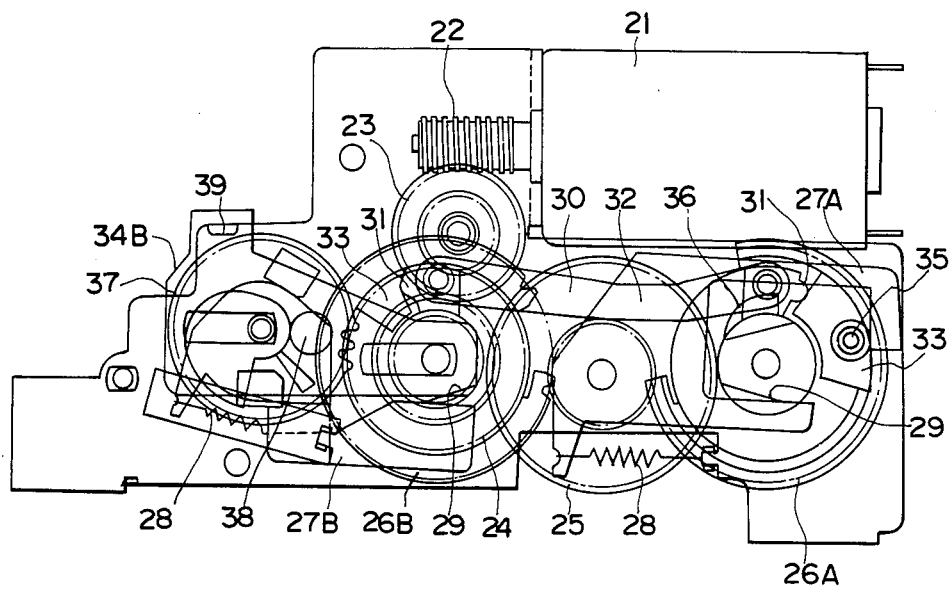
Figure 10:
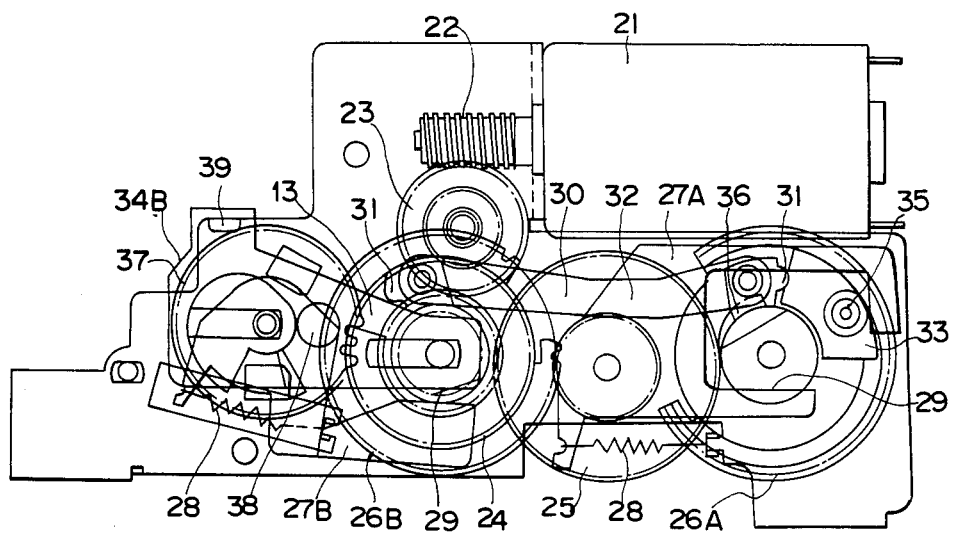

If the driving motor 21 is rotated from the configuration of FIG. 9, the first intermittent gear 26B is slightly rotated and held at its inactivated (dormant) position by the holding member 27A as shown in FIG. 10. At this time, the engaging pin 35 of the first intermittent gear 26A has been moved back to a slightly forward position with respect to the position of FIG. 8. In this connection, the slot cam 40 of the slide plate 34A is provided with an overstroke so that a pack guide brought to a lower position is held there.

(2) Pinch roller close contact motion:

In the gear changing position of FIG. 10, with a further forward rotation of the driving motor 21, the second intermittent gear 26B is rotated clockwisely, and its engaging portion 33 moves away from the pivotal member 31 of the initial driving link 30.

On the other hand, the cam gear 37 rotates in the clockwise direction in response to the counterclockwise rotation of the second intermittent gear 26B, and drives the slide plate 34B (for close contact motion of the pinch roller) forwardly (to the right in the drawing). Finally, as shown in FIG. 12, when the second intermittent gear 26B finishes about a half revolution until the engaging pin 38 of the slide plate 34B rides on the largest diameter portion of the cam gear 37, the slide plate 34B completes its forward movement, and the pinch roller is brought into close contact with a capstan shaft by the pinch roller close contact member responsive to the slide plate 34B.

Figure 11:
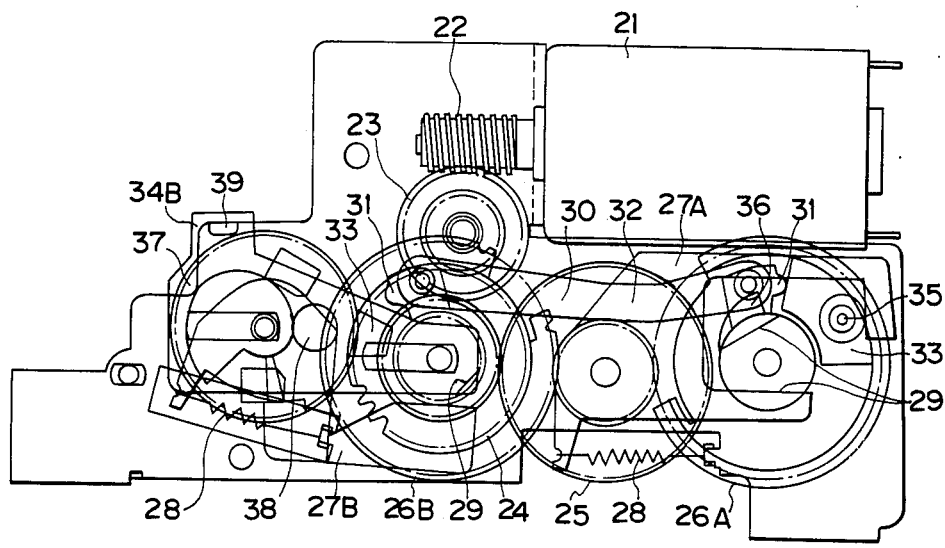
Figure 12:
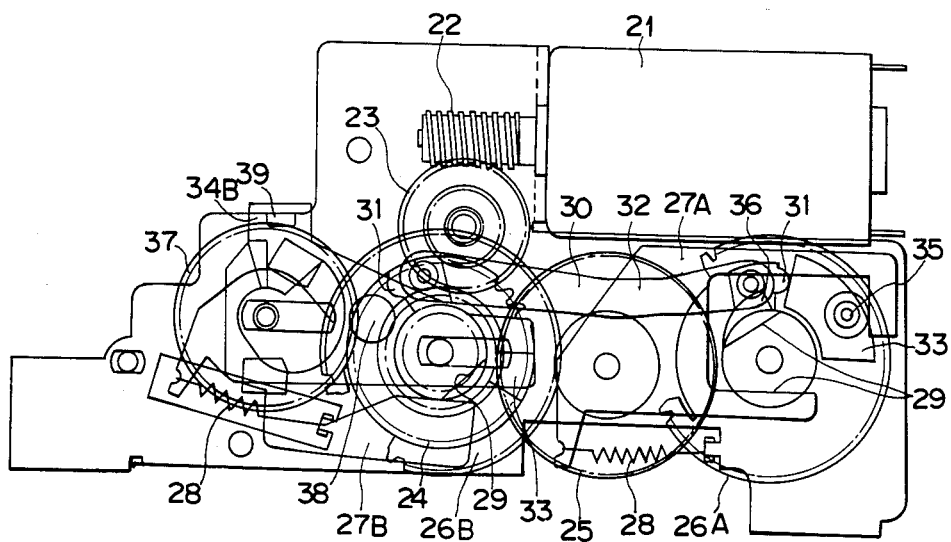

(3) From pinch roller detaching motion to gear changing motion:

When the driving motor 21 is rotated reversely from the configuration of FIG. 12, the second intermittent gear 26B rotates clockwisely. Responsively, the cam gear 37 rotates counterclockwisely and moves the pinch roller moving slide plate 34B rearwardly (to the left in the drawing). Subsequently, when the engaging pin 38 of the slide plate 34B falls in the small diameter portion of the cam gear 37 as shown in FIG. 11, the slide plate 34B moves back to a rear position, and the pinch roller is detached from the capstan shaft.

When the second intermittent gear 26B finished about a half revolution from the starting position of FIG. 12, its engaging portion 33 engages the pivotal member 31 as shown in FIG. 10, and pushes same forwardly (to the right in the drawing). As a result, the pivotal member 31 of the first intermittent gear 26A is pivoted forwardly (to the right in the drawing) via the elongated member 32 and engages the engaging portion 33 of the first intermittent gear 26A. Therefore, the first intermittent gear 26A slightly rotates counterclockwisely into engagement with the driving gear 25 (FIG. 9).

If the driving motor 21 is rotated from the configuration of FIG. 9, the second intermittent gear 26B is slightly rotated and held at its inactivated (dormant) position by the holding member 27B as shown in FIG. 8.

(4) Ejecting motion:

When the driving motor 21 is rotated reversely from the configuration of FIG. 8, the first intermittent gear 26A rotates clockwisely, and its engaging pin 35 from a forward position (from a right-hand position in the drawing) to a rear position (to a left-hand position in the drawing). Therefore, the guide pin 42 engaging the slot cam 41 of the slide plate 34A also moves from a lower position to an upper position. Finally, when the first intermittent gear 26A reaches the forward motion starting position of FIG. 7, the driving motor 21 stops, the operation is completed.

As described, according to the invention, since the initial driving link 30 is provided between the two intermittent gears 26A and 26B so as to readily effect a change of gears, motions of two operation members not shown effected by the first intermittent gear 26A and reciprocal motion of the operation member 37 effected by the second intermittent gear 26B can be performed independently. More specifically, the aforegoing embodiment, merely using the plate-shaped initial driving link 30, contributes to a significant dimensional reduction and simplification of the mechanism as compared to the prior art mechanism using a plunger or a manual force as the initial driving means. Additionally, the use of the slide plates 34A and 34B to connect the first and second intermittent gears 26A and 26B to the pack guide and the pinch roller close contact member, respectively, also contributes to a space saving.

The invention is not limited to the above-described embodiment, but may include some modifications within the scope of the invention. For example, the cam gear 37 for connection between the second intermittent gear 26B and the slide plate 34B may be omitted if adequate load adjustment is established in the arrangement of the pinch roller close contact member and latter stage members. Further, respective operating members may have other appropriate configurations. Further, the intermittent gears need not be identical in dimension, and other suitable arrangement may be adopted for engagement between the initial driving link and each intermittent gear.

As described above, the aforegoing embodiment of the invention employs an arrangement using the initial driving link provided between two intermittent gears so that the slide plates linked to the respective intermittent gears effect up and down movement of the pack guide and movement of the pinch roller with respect to a capstan, respectively. Therefore, it provides an excellent pack loading drive mechanism which not only has the pack loading motion and the pinch roller close contact function but also attains scale reduction and simplification which have not been attained by the prior art technology.

What is claimed is:

1. An intermittent gear mechanism comprising:
    a driving motor;
    a driving gear linked to said driving motor;
    first and second intermittent gears opposed at opposite sides of said driving gear;
    holding members using resilient force to hold said intermittent gears at their inactivated positions disengaged from said driving gear respectively;
    an initial driving link including two pivotal members pivotably mounted on shafts of said intermittent gears and an elongated member extending between said intermittent gears and having opposite ends pivotably connected to respective ends of said pivotal members; and
    engaging portions each provided on each said intermittent gear to engage said initial driving link and be urged thereby toward an initial driven position of the intermittent gear for engagement with said driving gear when the intermittent gear is located near said inactivated position.

2. An intermittent gear mechanism of claim 1 used in a pack loading drive mechanism in a cassette tape player, said pack loading drive mechanism comprising:
    a pack loading slide plate moved by said first intermittent gear back and forth to move a pack guide carrying a tape cassette up and down; and
    a pinch roller moving slide plate moved by said second intermittent gear back and forth to bring a pinch roller to and away from a capstan shaft.

* * * * *